United States Patent
Ahn et al.

(10) Patent No.: US 8,525,489 B2
(45) Date of Patent: Sep. 3, 2013

(54) SYSTEM AND METHOD FOR DIRECTLY AND INSTANTANEOUSLY CONTROLLING EXCITER OF GENERATOR

(75) Inventors: Jinwoo Ahn, Busan (KR); Donghee Lee, Busan (KR)

(73) Assignee: Kyungsung University Industry Cooperation Foundation, Busan (KR)

( * ) Notice: Subject to any disclaimer, the term of this patent is extended or adjusted under 35 U.S.C. 154(b) by 664 days.

(21) Appl. No.: 12/681,072

(22) PCT Filed: Oct. 2, 2008

(86) PCT No.: PCT/KR2008/005807
§ 371 (c)(1),
(2), (4) Date: Mar. 31, 2010

(87) PCT Pub. No.: WO2009/045058
PCT Pub. Date: Apr. 9, 2009

(65) Prior Publication Data
US 2010/0201329 A1    Aug. 12, 2010

(30) Foreign Application Priority Data
Oct. 4, 2007  (KR) .................. 10-2007-0099676

(51) Int. Cl.
*H02P 11/00* (2006.01)
*H02P 9/00* (2006.01)
(52) U.S. Cl.
USPC .............................................. 322/24; 322/28
(58) Field of Classification Search
USPC ................... 322/28, 20, 24, 44; 363/71, 109
See application file for complete search history.

(56) References Cited

U.S. PATENT DOCUMENTS

| | | | | |
|---|---|---|---|---|
| 4,777,425 A | * | 10/1988 | MacFarlane | 322/28 |
| 4,956,598 A | * | 9/1990 | Recker et al. | 322/28 |
| 5,216,350 A | * | 6/1993 | Judge et al. | 322/25 |
| 5,231,344 A | | 7/1993 | Marumoto et al. | |
| 5,373,196 A | * | 12/1994 | Faley | 307/46 |
| 5,753,989 A | * | 5/1998 | Syverson et al. | 310/114 |
| 6,707,279 B2 | * | 3/2004 | Stefanovic et al. | 322/47 |

(Continued)

FOREIGN PATENT DOCUMENTS

| | | | |
|---|---|---|---|
| JP | 04140027 A | * | 5/1992 |
| JP | 02616047 B2 | | 6/1997 |
| JP | 2005065438 A | * | 3/2005 |
| KR | 10-2003-0035273 A | | 5/2003 |

OTHER PUBLICATIONS

Sul, Seungki, "Control theory of electric machine", Seoul : Brain Korea, 2000, pp. 64-69.

(Continued)

*Primary Examiner* — Julio Gonzalez
(74) *Attorney, Agent, or Firm* — Kile Park Reed & Houtteman PLLC

(57) ABSTRACT

A system for directly and instantaneously controlling the exciter of a generator. A voltage error calculator calculates a voltage error of output voltage of the generator which is regulated by an instruction voltage and a time constant. A switching signal generator generates switching signals in response to the voltage error. An exciter controller controls the exciter in response to the switching signals. Thus, the system can induce the maximum response characteristic of a power converter only by setting the time constant of a controller without a complicated design for determining gains of the controller. Further, the system can considerably inhibit overshoot from occurring in a transient response state.

6 Claims, 8 Drawing Sheets

(56) References Cited

U.S. PATENT DOCUMENTS

| | | | |
|---|---|---|---|
| 6,969,922 B2 * | 11/2005 | Welches et al. | 290/1 A |
| 7,453,241 B2 * | 11/2008 | Keiter et al. | 322/28 |
| 2003/0020436 A1 * | 1/2003 | Coles et al. | 322/44 |
| 2004/0008010 A1 * | 1/2004 | Ebrahim et al. | 322/44 |
| 2008/0303489 A1 * | 12/2008 | Park et al. | 322/20 |
| 2012/0013322 A1 * | 1/2012 | Dearborn | 323/283 |
| 2012/0268081 A1 * | 10/2012 | Tripathi et al. | 322/28 |

OTHER PUBLICATIONS

PCT International Search Report of International Application No. PCT/KR2008/005807.

* cited by examiner

SYSTEM AND METHOD FOR DIRECTLY AND INSTANTANEOUSLY CONTROLLING EXCITER OF GENERATOR

TECHNICAL FIELD

The present invention relates to a system and method for directly and instantaneously controlling the exciter of a generator and, more particularly, to a system and method for directly and instantaneously controlling the exciter of a generator, which a switching signal is used corresponding to an error in feedback voltage of the generator which is regulated by both an output reference voltage, i.e. an instruction voltage, and a time constant.

BACKGROUND ART

The excitation system of a synchronous generator is primarily directed to supplying direct current to a field winding of the generator to constantly maintain or regulate an output terminal voltage of the generator. The excitation system inhibits disturbance generated from a power system through the regulation of the terminal voltage to thereby improve stability, and controls transmission voltage or high voltage of a step-up transformer of a power plant to thereby stabilize voltage, thereby serving as a power condenser and a synchronous condenser at a load terminal.

The excitation system can be divided into a controller part that functions to control voltage of the generator and protect and restrict the excitation system of the generator, and a phase control rectifier part that receives a control signal from the controller and then supplies a required field current. The controller part is basically made up of a terminal voltage setter, a detecting and filtering part of the voltage of the generator, and a proportional integral controlling part of the voltage of the generator, and electrically and thermally protects the generator to be controlled and the excitation system itself, thereby allowing the generator to exert the maximum performance within its own capability.

The phase control rectifier part secures excitation voltage from an excitation transformer connected to an exciter or a generator output terminal, converts the alternate current voltage into direct current voltage at a thyristor phase control rectifier, and then supplies the converted direct current voltage to a field system of the generator. From the viewpoint of the capability of the synchronous generator, the excitation system automatically regulates field current in response to a change in active output or reactive output and a change in terminal voltage of an synchronous machine within a range in which the synchronous generator can continuously operated, thereby having to be able to rapidly and stably maintain the generator terminal voltage as a target value. Further, the excitation system performs field reinforcement conforming with instantaneous and short time performance of the generator, thereby having to be able to cope with transient disturbance.

With the development of technologies for semiconductor devices, a high capacity rectifier appeared. Thus, most of excitation systems have recently employed static excitation systems. The static excitation system has a fast control response and high ceiling voltage, and thus is advantageous to improvement measures for transient stability of the system, but may damage dynamic stability. For this reason, in order to inhibit power disturbance of the power system from the excitation system having fast response, a power system stabilizer (PSS) is added to contribute to stable operation of the power system.

The excitation system can be generally classified into three types according to its constituent instrument and controller: a direct current exciter system using a direct current generator, a static excitation system configured of an excitation transformer and a thyristor transformer (rectifier), and an alternate current exciter system configured of an alternate current exciter generator and a diode rectifier. A recent trend shows that the static excitation system, which has a response due to the development of power semiconductor technologies and is favorable for maintenance a lack of a rotational part, is mainly applied. The static excitation system obtains excitation power from an output terminal of the generator, so that, when line contingency occur at the output terminal, the excitation power cannot be stably secured.

The excitation system must constantly maintain the generator voltage in order to supply stable power to the power system, and be able to rapidly restore the voltage when the power system undergoes sharp voltage drop. To this end, the excitation system requires a function for controlling the voltage of the generator, and a function for protecting the generator and its surrounding systems.

In conjunction with the voltage control of the generator, an automatic voltage regulator (AVR) functions to automatically regulate the terminal voltage of the generator so as to be matched with a given setup value despite a change in operation situation of the generator.

Synchronous generator systems to which the AVR is applied are widely used because of robustness against load variation and high reliability, ranging from generators for land plants to emergency generators for buildings and military and marine power equipment. In general, a number of AVRs for controlling the output voltage of the generator have employed analog AVRs designed for the generators. However, the system is complicated due to demands for parallel operation and high-performance control, in addition to difficulty in AVR application and variation in parameters associated with production of various generators.

Recently, due to the performance problem, the conventional AVR has been gradually converted into a digital AVR (DAVR). A variety of controllers for constantly controlling the output voltage of the generator in the DVAR system are studied. However, most of actual plants widely employ a classic proportional-integral-derivative (PID) controller. This is because the PID controller is simple, and is familiar to on-the-site engineers. Nevertheless, the PID controller shows different response characteristics depending on which control gain is selected. As such, it is very difficult to regulate the control gain. If a high control gain is selected in order to reduce a steady state error, there is a problem that high overshoot etc. occurs during a transient response.

In addition to the problem of this control technique, the existing exciter control system has problems with the response of the power converter and the stability of noise of the switching device. As the power converter for controlling the field voltage of the existing exciter, a thyristor control rectifier (TCR) is classically and widely used. However, in the case of the TCR, a three-phase synchronous machine having a rated frequency of 60 Hz, a control signal can be output once per 180 Hz, and thus the response characteristic of a transient state is very slow. Due to noise caused by high-frequency current based on control of this firing angle, a gate generator and a controller cause malfunction.

DISCLOSURE OF INVENTION

Technical Problem

Accordingly, the present invention has been made in an effort to solve the problems occurring in the related art, and an embodiment of the present invention provides a system for controlling the exciter of a synchronous generator based on a direct and instantaneous voltage control technique, which is robust against load variation and is capable of easily being applied on the spot due to very simple configuration of a controller.

Another embodiment of the present invention provides a system for controlling the exciter of a synchronous generator based on a direct and instantaneous voltage control technique, which can easily induce the maximum response characteristic of a power converter only by setting the time constant of a controller without a complicated design, and considerably inhibit overshoot from occurring in a transient response state.

Another embodiment of the present invention provides a system for controlling the exciter of a synchronous generator based on a direct and instantaneous voltage control technique, which continuously controls constant voltage without output voltage of the generator to be able to provide a constant response characteristic and reduce malfunction.

Technical Solution

According to embodiments of the present invention, there is provided a system for directly and instantaneously controlling the exciter of a generator, which includes a voltage error calculator calculates a voltage error of output voltage of the generator which is regulated by an instruction voltage and a time constant, a switching signal generator generates switching signals in response to the voltage error, and an exciter controller controls the exciter in response to the switching signals.

ADVANTAGEOUS EFFECTS

According to embodiments of the present invention, the exciter control system based on a direct and instantaneous voltage control technique is robust against load variation, and is capable of easily being applied on the spot due to very simple configuration of a controller. The exciter control system uses a technique of directly controlling the switching pattern of a power converter in order to control instantaneous torque in a high-performance electric motor and a power converter. Thus, unlike the motor, the generator voltage control system does not require a torque model based on current or voltage, and a complicated design for determining gains of a controller because it can directly feed back terminal output voltage of the generator in addition to very easy application.

Further, the exciter control system can easily induce the maximum response characteristic of a power converter only by setting the time constant of a controller without a complicated design, and considerably inhibit overshoot from occurring in a transient response state. Since the instantaneous voltage control technique cannot be applied using an existing TCR power converter, the exciter control system employs an insulated gate bipolar transistor (IGBT) type inverter that can be switched at a high speed.

In addition, a power converter to which the IGBT is applied controls continuous output voltage, so that it can continuously control constant voltage regardless of the output voltage of the generator without a burden caused by detection and operation of a firing angle. Thus, the exciter control system can inhibit inflow of high-frequency current caused by the operation of the firing angle of a TCR, so that it can obtain constant response characteristic and reduce malfunction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

MODE FOR THE INVENTION

Figure 1:
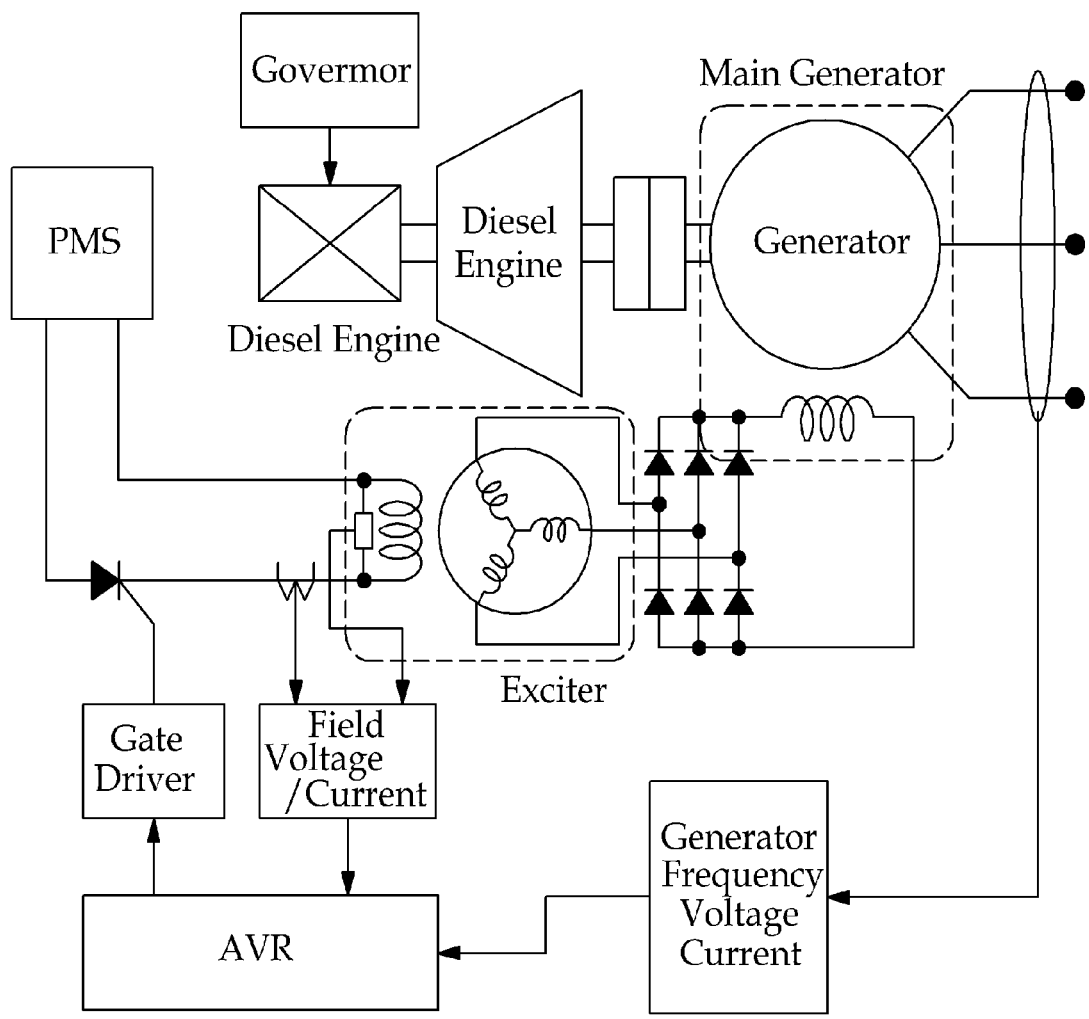
FIG. 1 is a block diagram illustrating a basic system for controlling a synchronous generator driven by a diesel engine.

A system for directly and instantaneously controlling the exciter of a generator according to an exemplary embodiment of the present invention preferably includes a voltage error calculator calculating a voltage error of output voltage of the generator which is regulated by an instruction voltage and a time constant, a switching signal generator generating switching signals in response to the voltage error, and an exciter controller controlling the exciter in response to the switching signals.

The voltage error calculator preferably includes a voltage detector detecting the output voltage of the generator, an output voltage regulator differentiating the output voltage with respect to a predetermined time constant to thereby regulate the output voltage, and a summer calculating the voltage error between the instruction voltage and the regulated output voltage.

The time constant is a lag time constant for feeding back the output voltage, and thus preferably suppresses noise of the output voltage caused by switching.

The switching signal generator preferably includes a chopper type inverter based on an insulated gate bipolar transistor (IGBT) such that the switching signals can be continuously generated.

The switching signals preferably have different states in response to a band of the voltage error.

Each switching signal Sk has one of two states of 1 and 0. If the switching signal Sk has a lagging phase, then it operates as follows. In contrast, if the switching signal Sk has a leading phase, then it operates in inverse relation to when having the lagging phase.

$$S_k = \begin{cases} 1 : e(k) > e_{BW} \\ 0 : e(k) < -e_{BW} \end{cases}$$

wherein $e_{BW}$: setting error of output terminal voltage, and $$e(k) = V_{REF} - V_{GS},$$

and $$V_{GS} = \left(\frac{1}{1+sT_F}\right) \cdot V_T,$$

wherein $V_T$: terminal output voltage of the generator, and $T_F$: feedback first-order lag time constant of output voltage of the generator.

Preferably, the system for directly and instantaneously controlling the exciter of a generator further includes a switching state controller, which controls the state of the switching signal to be continuously turned off or on so as to prevent over-excitation and under-excitation of the generator.

The switching state controller preferably includes an over-excitation limiter restricting the over-excitation of the generator, and an under-excitation limiter restricting the under-excitation of the generator.

A method for directly and instantaneously controlling the exciter of a generator according to an exemplary embodiment of the present invention preferably includes the steps of calculating an voltage error of feedback voltage of the generator which is regulated by an instruction voltage and a time constant, generating different switching signals in response to a band of the voltage error, and controlling an exciter or the generator in response to the switching signals.

The switching signals are two state signals output by a chopper type inverter having IGBT that can be continuously switched on and off. The two state signals preferably include a first state signal by which the IGBT is turned on to apply field voltage, and a second state signal by which the IGBT is turned off to enter free wheeling.

The system for directly and instantaneously controlling the exciter of a generator according to an exemplary embodiment of the present invention preferably includes a voltage error calculator calculating a voltage error of actual output voltage of the generator which is regulated by an instruction voltage and a time constant, a switching signal generator generating switching signals in response to the voltage error, and an exciter controller controlling the exciter in response to the switching signals.

FIG. 1 is a block diagram illustrating a basic system for controlling a synchronous generator driven by a diesel engine. Referring to FIG. 1, the system for controlling a synchronous generator generally includes a diesel engine and a governor driving the synchronous generator, an automatic voltage regulator, an exciter, the generator, and a power system. Here, the exciter and the generator are variously combined according to a generating system. The exciter is supplied with power by a power management system (PMS). The PMS includes a static excitation system, which supplies voltage of the output terminal of the generator and power from a transformer, and a brushless excitation system, which supplies power from output of a permanent magnet synchronous generator attached to the generator, according to configuration of the generator. In addition to these excitation systems, there is an excitation system that is supplied with power from an uninterruptible power supply (UPS) or an external power supply and then controls a field system of the exciter.

In the synchronous generator control system of FIG. 1, it is field current of the generator caused by output voltage of the exciter that actually controls the output of the generator. The output voltage of the generator is controlled by controlling field voltage of the exciter depending on a firing angle of a thyristor connected to the field system of the exciter. At this time, the firing angle of the thyristor actually varies according to a frequency of the voltage supplied from the PMS. In the case in which 3-phase 60 Hz power is supplied, the field voltage can be controlled only once per 180 Hz.

Thus, this synchronous generator control system has disadvantages in that it is difficult to regulate minute output voltage, that the voltage of the generator varies according to a control error of a precise firing angle, and that a response to sharp load variation is degraded.

Figure 2:
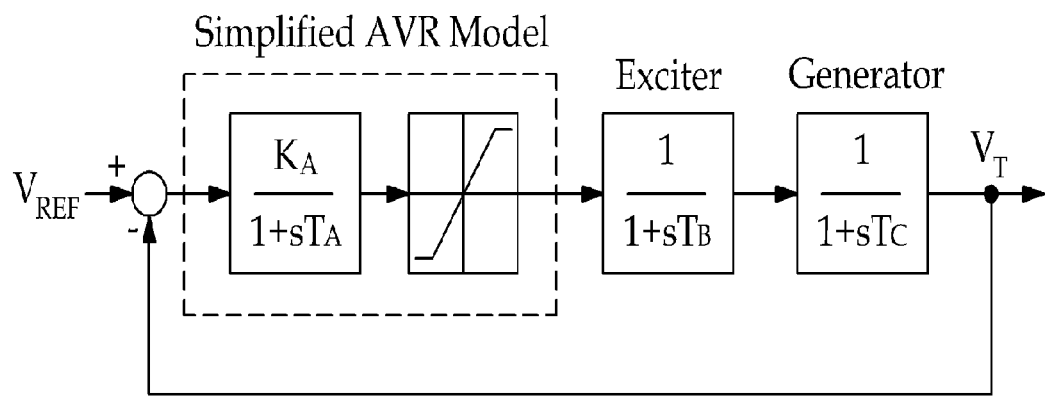
FIG. 2 is a block diagram illustrating a simplified synchronous generator control system.

FIG. 2 is a block diagram illustrating a simplified synchronous generator control system.

Referring to FIG. 2, $K_A$ and $T_A$ represent the amplification gain and the time constant of an AVR, and $T_B$ and $T_C$ represent time constants of an exciter and a generator. A transfer function of the simplified synchronous generator control system is as follows.

$$G(s) = \frac{K_A}{(1+sT_A)(1+sT_B)(1+sT_C)} \quad (1)$$

In the transfer function of the simplified synchronous generator control system, a response characteristic of the system is very dependent on the amplification gain of the AVR, and thus it is very difficult to configure a stable controller. Thus, it is necessary to apply a proportional-integral-derivative (PID) controller as in FIG. 3.

Figure 3:
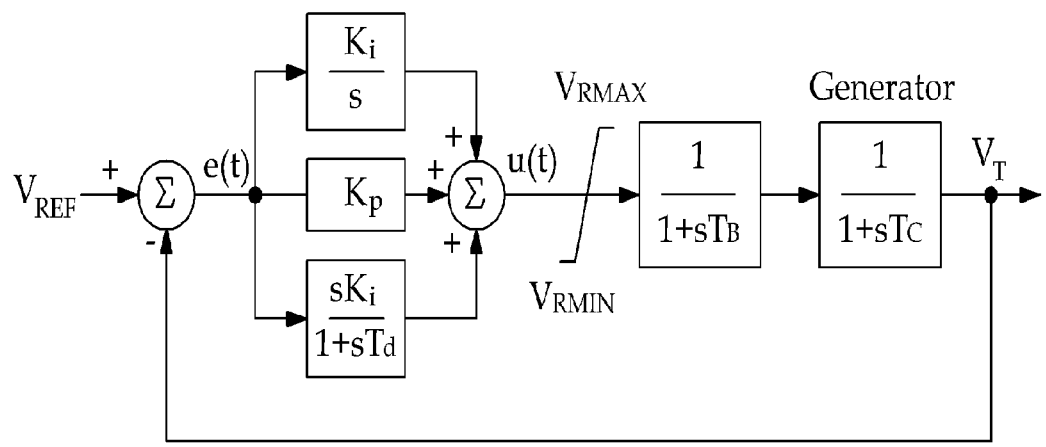
FIG. 3 is a control block diagram of a DVAR device based on a PID controller.

FIG. 3 is a control block diagram of a DVAR device based on a PID controller. The output of an ordinary PID controller as in FIG. 3 is as follows.

$$e(t) = V_{REF} - V_T \quad (2)$$

$$u(t) = K_P \cdot e(t) + K_i \cdot \int e(t)dt + K_d \frac{e(t)}{dt} \quad (3)$$

wherein $V_T$: terminal output voltage of the generator, and $K_p$, $K_i$, and $K_d$: proportional, integral and derivative control gains.

The PID controller deformed into a discrete model in the DVAR is expressed as follows.

$$u(k) = K_P \cdot e(t) + K_i \cdot \sum_{n=0}^{k} e(k) \cdot T_S + K_d(e(k) - e(k-1)) \quad (4)$$

wherein $T_S$: sampling period of the digital controller.

The PID controller expressed as in Equation (4) provides simple configuration and easy calculation, and thus is easily applied to the DVAR system. However, the PID controller has a basic drawback in that it is very difficult to regulate each control gain.

In contrast, according to an embodiment of the present invention can provide an exciter control system to which an instantaneous voltage control technique can be easily applied on the spot due to very simple configuration of the controller is applied. The instantaneous voltage control technique is a method that directly controls a switching pattern of a power converter in order to control instantaneous torque in a high-performance electric motor and in a power converter. Thus, unlike the electric motor, the generator voltage control system can directly determine a switching pattern for terminal output voltage of the generator without a torque model based on current or voltage.

Figure 4:
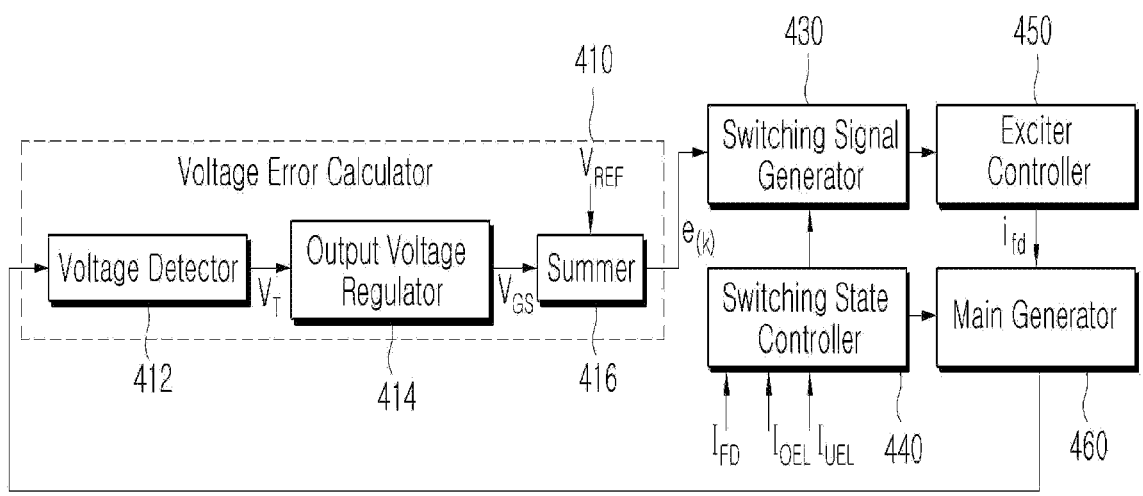
FIG. 4 is a block diagram illustrating a system for directly and instantaneously controlling the exciter of a generator according to an exemplary embodiment of the present invention.

FIG. 4 is a block diagram illustrating a system for directly and instantaneously controlling the exciter of a generator according to an exemplary embodiment of the present invention. The system for directly and instantaneously controlling the exciter of a generator includes a voltage error calculator 410 calculating a voltage error of feedback voltage of the generator which is regulated by an instruction voltage and a time constant, a switching signal generator 430 generating switching signals in response to a band of the voltage error, a switching state controller 440 controlling a switching state so as to prevent over-excitation and under-excitation of the generator, and an exciter controller 450 controlling an exciter in response to the switching signals.

The voltage error calculator 410 preferably includes a voltage detector 412 detecting the output voltage of the generator, an output voltage regulator 414 differentiating the output voltage with respect to a predetermined time constant to thereby regulate the feedback voltage, and a summer 416 calculating the voltage error between the instruction voltage and the feedback voltage. In the summer 416, $V_{ref}$ enters + input of the summer 416, and $V_T$ enters − input of the summer. Thus, e(t) is a difference between $V_{ref}$ and $V_T$, and when a part shown in the block diagram is expressed by an equation, $e(t)=V_{ref}+(-V_T)$. The switching signal generator 430 generates output for reducing e(t) through each control method, and forms a switching pattern to operate an converter using the generated output.

The switching pattern output from the switching signal generator 430 can be differently formed according to a power converter. The switching signal generator 430 preferably employs a chopper type inverter configured of IGBT that can be continuously switched.

Figure 5:
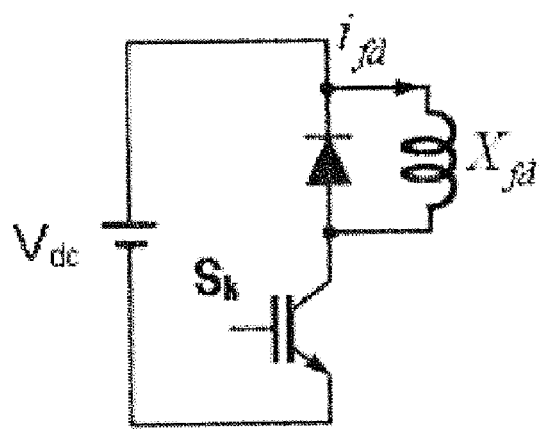
FIGS. 5 through 7 illustrate an example of an operation mode according to the switching state of a chopper type inverter according to an embodiment of the present invention.
Figure 6:
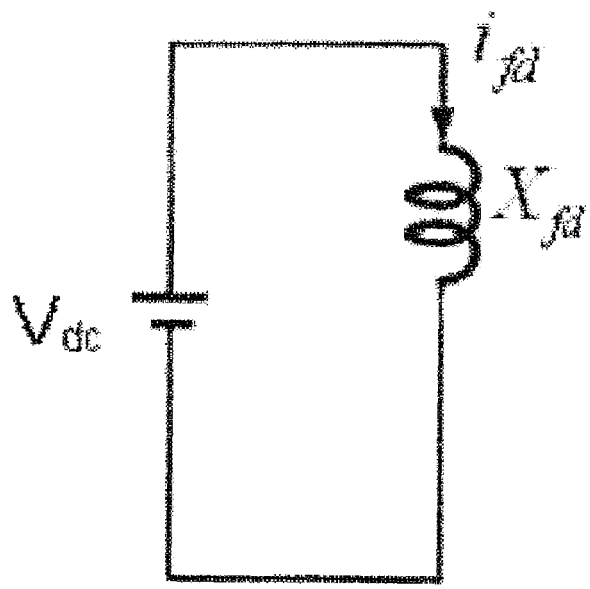
Figure 7:
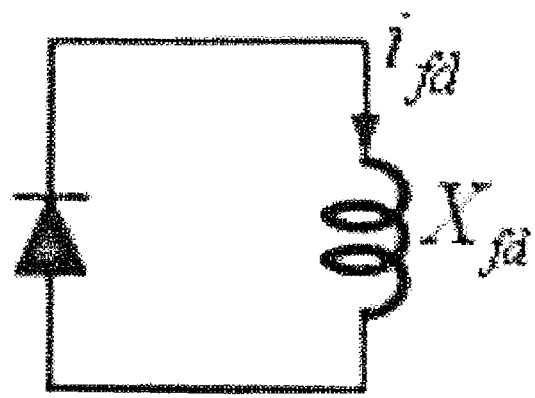

FIGS. 5 through 7 illustrate an example of an operation mode according to the switching state of a chopper type inverter according to an embodiment of the present invention. FIG. 5 illustrates an example of a chopper type inverter structure. FIG. 6 illustrates an operation mode of switching state 1 of a chopper type inverter. FIG. 7 illustrates an operation mode of switching state 0 of a chopper type inverter. The switching states include state 1 in which the IGBT is turned on to apply field voltage, and state 0 in which the IGBT is turned off to enter free wheeling. The magnitude of the applied voltage according to each state is as follows.

State 1

$$V_{FD}=V_{dc} \quad (5)$$

State 0

$$V_{FD}=0 \quad (6)$$

The switching state controller 440 controls the state of a switching signal to be continuously turned on or off so as to prevent the over-excitation and under-excitation of the generator. The switching state controller 440 preferably includes an over-excitation limiter restricting the over-excitation of the generator, and an under-excitation limiter restricting the under-excitation of the generator.

Figure 8:
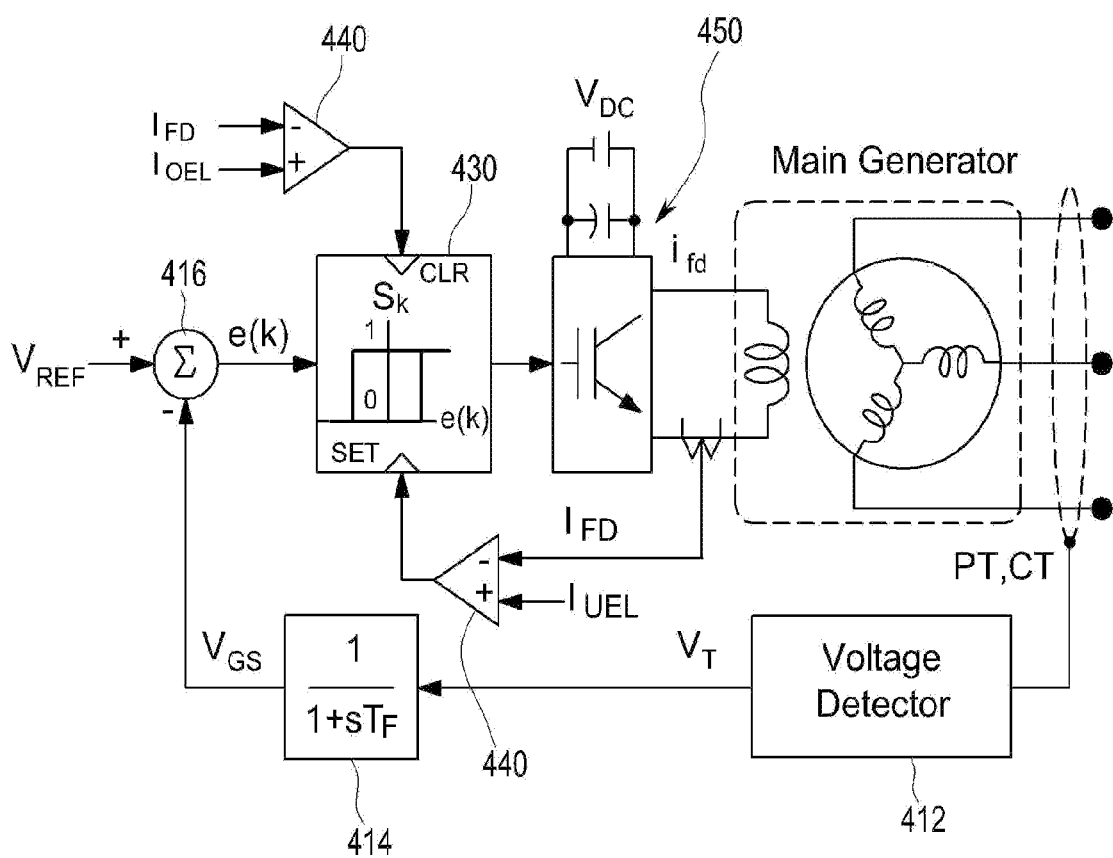
FIGS. 8 and 9 are block diagrams illustrating an example of a system based on direct field control mode and an example of a DIVC controller based on an exciter field control mode.
Figure 9:
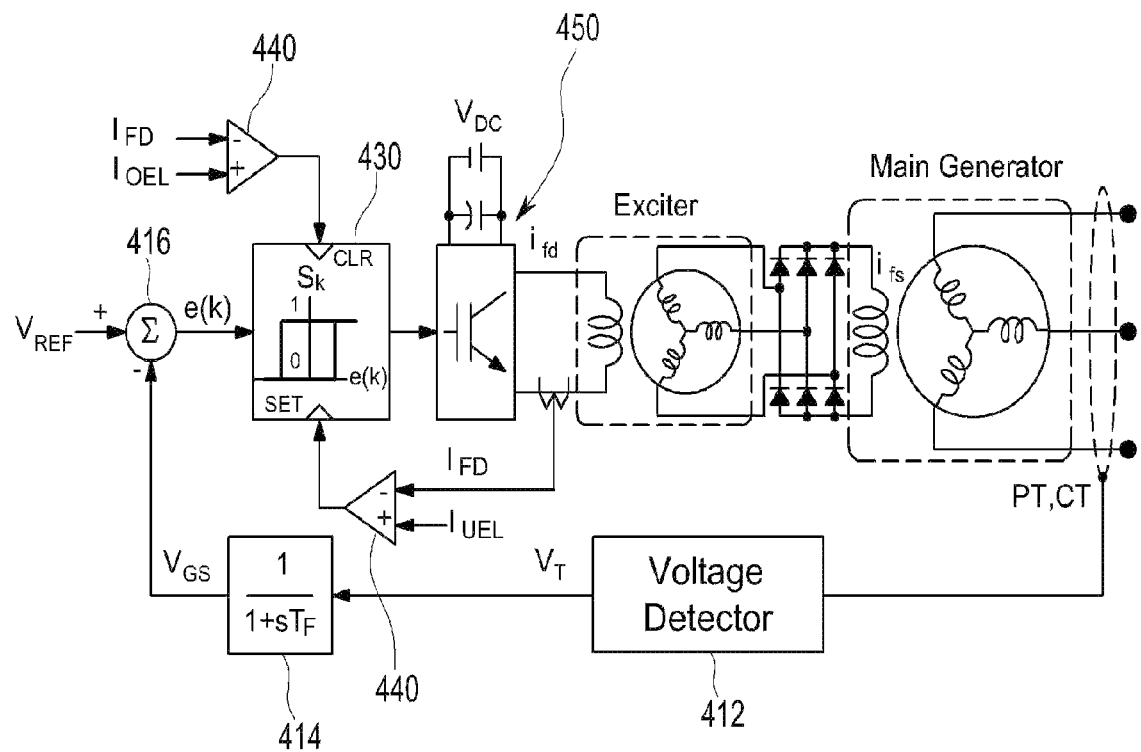

FIGS. 8 and 9 are block diagrams illustrating an example of a system based on direct field control mode and an example of a DIVC controller based on an exciter field control mode.

Referring to FIGS. 8 and 9, switching is determined by an voltage error e(k) output from the voltage error calculator. More specifically, the switching of the IGBT inverter is determined by the voltage error between an actual output terminal voltage of the generator with respect to instruction voltage $V_{REF}$ and an feedback voltage $V_{GS}$.

Return to FIGS. 8 and 9, the switching signal generator 430 employs a chopper type inverter. When a switching signal Sk output from switching signal generator 430 has a lagging phase in a unit sampling section, it is determined by the voltage error of the generator as follows. In contrast, when the switching signal Sk output from switching signal generator 430 has a leading phase in the unit sampling section, it operates inversely.

$$e(k) = V_{REF} - V_{GS} \quad (7)$$

$$V_{GS} = \left(\frac{1}{1+sT_F}\right) \cdot V_T \quad (8)$$

$$S_k = \begin{cases} 1 : e(k) > e_{BW} \\ 0 : e(k) < -e_{BW} \end{cases} \quad (9)$$

wherein $V_T$: terminal output voltage of the generator, $T_F$: feedback first-order lag time constant of output voltage of the generator, and $e_{BW}$: setting error of output terminal voltage.

In the case of an ordinary chopper type inverter, applicable switching states are two states of 1 and 0 as illustrated in FIG. 6 and 7. In this case, the switching is determined depending on a band of the output voltage error by Equations 7 through 9.

Figure 10:
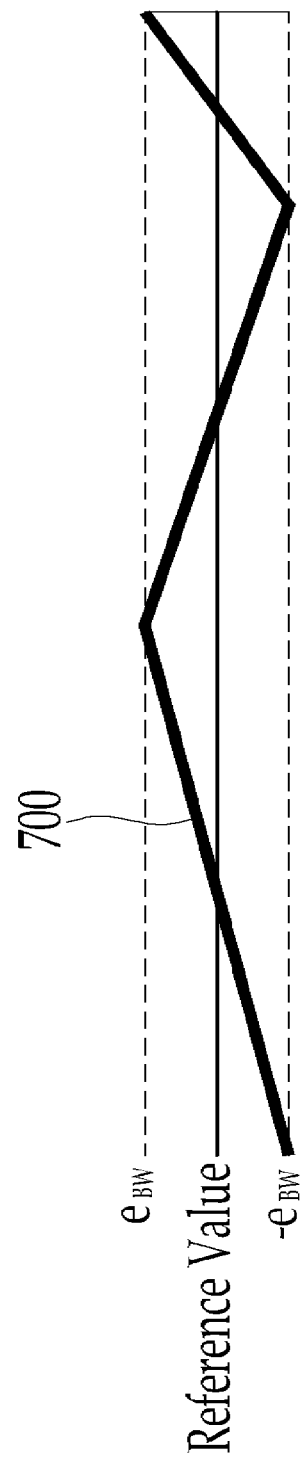
FIG. 10 is a view explaining an example of hysteresis control.

FIG. 10 is a view explaining an example of hysteresis control. Generally, in the hysteresis control has upper and lower limit values of a control band. Thus, when a control target exceeds the upper limit value on the basis of a hysteresis reference value, operation is made so as to decrease the value. In contrast, when the control target has a small value, operation is made so as to increase the value. Referring to FIG. 10, $e_{BW}$ given in Equation 9 represents an upper limit, and $-e_{BW}$ given in Equation 9 represents a lower limit. Referring to FIG. 10, an example of e(k) is shown through a curve 700.

Referring to FIGS. 8 and 9, $T_F$ is the first-order lag time constant for feeding back the terminal output voltage of the generator. The time constant is preferably regulated so as to inhibit noise of the output voltage caused by switching to output the output voltage in a smooth manner.

Further, $I_{OEL}$ and $I_{UEL}$ represent limit values of the field current for restricting the over-excitation and under-excitation of the generator. The state of a switching signal is controlled to be continuously turned on or off such that the generator does not undergo the over-excitation and under-excitation according to the output of the DIVC. In this way, the switching state is controlled.

Figure 11:
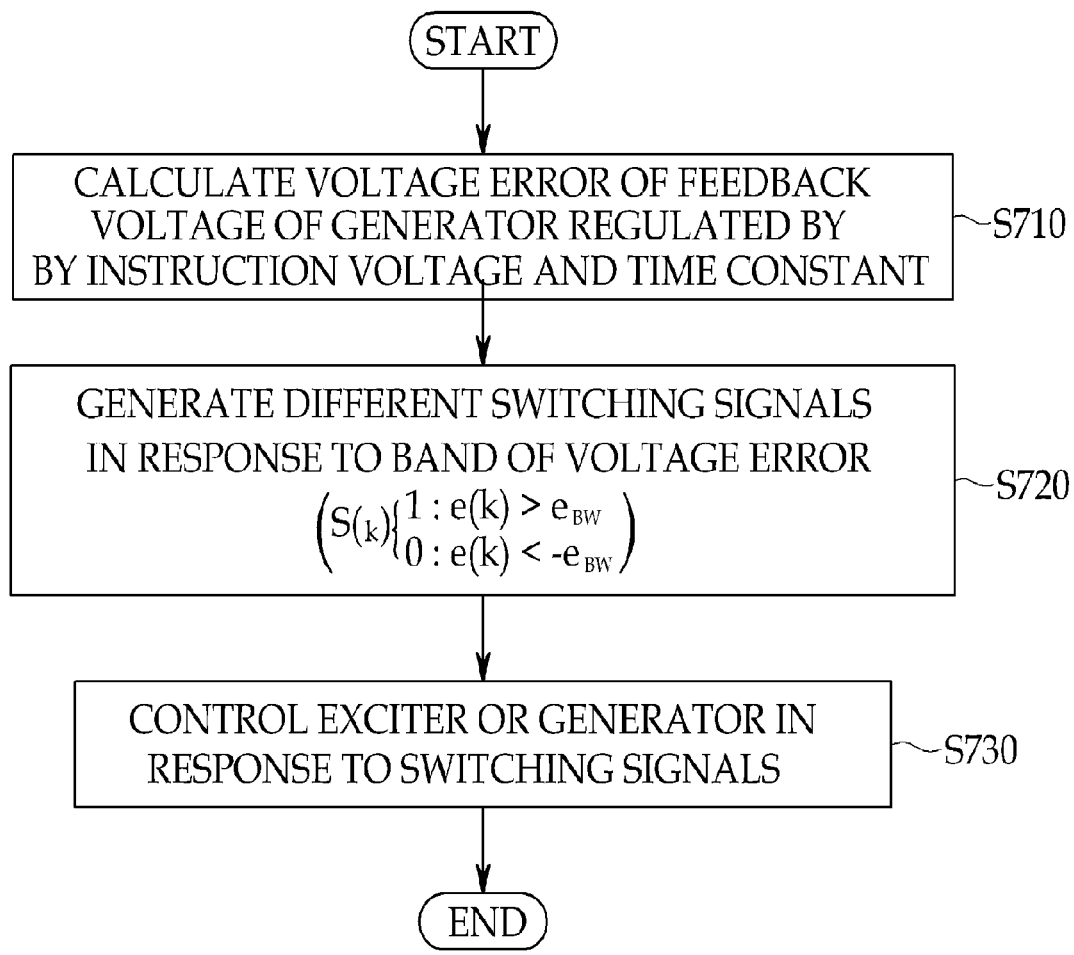
FIG. 11 is a flow chart illustrating a method for directly and instantaneously controlling the exciter of a generator according to an exemplary embodiment of the present invention.

FIG. 11 is a flow chart illustrating a method for directly and instantaneously controlling the exciter of a generator according to an exemplary embodiment of the present invention.

The voltage error calculator calculates a voltage error of feedback voltage of the generator regulated by an instruction voltage and a time constant (S710). The time constant for feeding back the terminal output voltage of the generator preferably uses a first-order lag time constant. Further, the time constant is preferably regulated so as to inhibit noise of the output voltage caused by switching to output the output voltage in a smooth manner.

In response to a band of the voltage error, different switching signals are generated (S720). The different switching signals are generated by comparing the band of the voltage error with the band of a setting error. An example of generating the different signals is given in Equation 7 through 9. The switching signals are preferably output as two state signals by the chopper type inverter configured of IGBT that can be continuously switched. The two state signals include state 1 in which the IGBT is turned on to apply field voltage, and state 0 in which the IGBT is turned off to enter free wheeling.

The exciter or the generator is controlled in response to the switching signals (S730).

The instantaneous voltage control technique according to an embodiment of the present invention can induce a maximum response characteristic of the power converter only by setting the time constant of the controller without a complicated design for determining gains of the controller. Further, the instantaneous voltage control technique can considerably inhibit overshoot from occurring in a transient response state.

The invention claimed is:

1. A system for directly and instantaneously controlling an exciter of a generator, the system comprising:
    a voltage error calculator calculating a voltage error of output voltage of the generator which is regulated by an instruction voltage and a time constant, the voltage error calculator including;
        a voltage detector detecting the output voltage of the generator;
        an output voltage regulator differentiating the output voltage with respect to a predetermined time constant to regulate the output voltage; and
        a summer calculating the voltage error between the instruction voltage and a regulated output voltage output from the output voltage regulator;
    a switching signal generator generating switching signals in response to the voltage error, wherein the switching signals have different states in response to a band of the voltage error,
    a switching state controller which controls a state of each switching signal to be continuously turned off or on, the switching state controller including an over-excitation limiter and an under-excitation limiter to restrict over-excitation and under-excitation of the generator; and
    an exciter controller controlling the exciter in response to the switching signals.

2. The system as set forth in claim 1, wherein the time constant include a lag time constant for feeding back the output voltage of the generator, and inhibits noise of the output voltage caused by switching.

3. The system as set forth in claim 1, wherein the switching signal generator includes a chopper type inverter based on an insulated gate bipolar transistor such that the switching signals can be continuously generated.

4. The system as set forth in claim 1, wherein each switching signal (Sk) includes one of two states of 0 and 1, and if the switching signal has a lagging phase, then the switching signal operates according to the following equation, and if the switching signal has a leading phase, then the switching signal operates in inverse relation to when having the lagging phase, $$S_k = \begin{cases} 1 : e(k) > e_{BW} \\ 0 : e(k) < -e_{BW} \end{cases}$$

wherein $e_{BW}$: setting error of output terminal voltage, and $e(k) = V_{REF} - V_{GS}$, and $$V_{GS} = \left(\frac{1}{1+sT_F}\right) \cdot V_T,$$

wherein $V_T$: terminal output voltage of the generator, and $T_F$: feedback first-order lag time constant of output voltage of the generator.

5. The system as set forth in claim 1, wherein the switching state controller includes an over-excitation limiter restricting the over-excitation of the generator, and an under-excitation limiter restricting the under-excitation of the generator.

6. A method for directly and instantaneously controlling an exciter of a generator, the method comprising the steps of:
    calculating a voltage error of output voltage of the generator which is regulated by an instruction voltage and a time constant;
    generating different switching signals in response to a band of the voltage error;
    controlling one of the exciter and the generator in response to the switching signals; and
    restricting over-excitation and under-excitation of the generator by controlling a state of each switching signal,
    wherein the switching signals are output as two state signals by a chopper type inverter based on an insulated gate bipolar transistor that can be continuously switched; and
    the two state signals include a first state signal by which the insulated gate bipolar transistor is turned on to apply field voltage, and a second state signal by which the insulated gate bipolar transistor is turned off to enter free wheeling.

* * * * *